(12) United States Patent
Van Hoecke et al.

(10) Patent No.: US 8,268,380 B2
(45) Date of Patent: Sep. 18, 2012

(54) PELLETS OF VEGETABLE PROTEIN

(75) Inventors: Pieter Paul Marc Van Hoecke, Meilegem (BE); Nicole S. J. De Cock, Heist-op-den-berg (BE)

(73) Assignee: Cargill, Incorporated, Wayzata, MN (US)

( * ) Notice: Subject to any disclaimer, the term of this patent is extended or adjusted under 35 U.S.C. 154(b) by 321 days.

(21) Appl. No.: 12/093,168

(22) PCT Filed: Nov. 3, 2006

(86) PCT No.: PCT/EP2006/068069
§ 371 (c)(1),
(2), (4) Date: Apr. 9, 2009

(87) PCT Pub. No.: WO2007/054465
PCT Pub. Date: May 18, 2007

(65) Prior Publication Data
US 2009/0304903 A1    Dec. 10, 2009

(30) Foreign Application Priority Data
Nov. 10, 2005   (EP) ..................................... 05256938

(51) Int. Cl.
*A23J 1/00* (2006.01)
(52) U.S. Cl. ........................................ 426/656; 426/454
(58) Field of Classification Search .................. None
See application file for complete search history.

(56) References Cited

U.S. PATENT DOCUMENTS

| | | | |
|---|---|---|---|
| 3,605,643 A | 9/1971 | Barr | |
| 5,102,671 A | 4/1992 | Coles | |
| 5,254,673 A | 10/1993 | Cook et al. | |
| 5,744,186 A * | 4/1998 | Harrison | 426/516 |
| 5,916,610 A | 6/1999 | Witt et al. | |
| 6,001,412 A | 12/1999 | Huber et al. | |
| 2005/0008759 A1 * | 1/2005 | Nie et al. | 426/656 |
| 2005/0214349 A1 | 9/2005 | Nie et al. | |

FOREIGN PATENT DOCUMENTS

| | | |
|---|---|---|
| EP | 0 711 510 | 5/1998 |
| EP | 0 838 159 | 8/2000 |
| EP | 1 527 700 | 5/2005 |
| EP | 1 743 529 | 1/2007 |
| GB | 2 297 019 * | 7/1996 |
| RU | 9712035 | 12/1997 |
| WO | WO 96/34539 | 11/1996 |

OTHER PUBLICATIONS

Hoseney, et al.: Wheat Gluten: A glassy polymer:, Cereal Chemistry., vol. 63, No. 3, 1986, pp. 285-286, XP00263525, USAmerican Association of Cereal Chemists. Minneapolis. ISSN: 0009-0352.

Li, W., Dobraszcczyk, B.J., and Schofield, J.D.: "Stress relaxation behaviour of wheat dough, gluten, and gluten protein fractions", Cereal Chemistry., vol. 80, No. 3, 2003, pp. 333-338, XP002623526, USAmerican Association of Cereal Chemists. Minneapolis. ISSN: 009-0352.

Hochstetter A et al: "Properties of gluten-based sheet produced by twin-screw extruder", Lebensmittel Wissenschaft and Technologie, Academic Press, London, GB, vol. 39, No. 8, 1 Oct. 2006, pp. 893-901, xp024953844. ISSN: 0023-6438.

* cited by examiner

*Primary Examiner* — Elizabeth Gwartney

(57) ABSTRACT

Pellets of vegetable protein Pellets, consisting of dried compressed proteins and a moisture content of maximum 12%, are described. These proteins comprise vital wheat gluten. A process for preparing these and the application in fish feed is described as well.

14 Claims, No Drawings

PELLETS OF VEGETABLE PROTEIN

CROSS-REFERENCE TO RELATED APPLICATIONS

This application is a National Stage application under 35 U.S.C. §371 and claims benefit under 35 U.S.C. §119(a) of International Application No. PCT/EP2006/068069 having an International Filing Date of Nov. 3, 2006, which claims the benefit of priority of EP 05256938.1 having a filing date of Nov. 10, 2005.

TECHNICAL FIELD

The present invention relates to a process for preparing pellets of dry vital wheat gluten and its application in fish feed.

BACKGROUND OF THE INVENTION

Proteins are used in diverse applications going from food to non-food applications. Currently these proteins are mainly available in a dried powder form.

Fish farming is an increasingly thriving industry in many parts of the world. Fish feed for farmed fish is usually produced in the form of pellets.

WO98/49904, relates to the formation of porous feed pellets by extrusion, drying, and absorbing oil into said pellets by vacuum coating. In addition, extruded fish feed is very delicate and must be transported using specialised systems to minimise damage.

An alternative method (WO97/22265) suggested coating the extrusion formed pellets with water soluble starches. The use of starches in the composition is uneconomical insofar as they are not (or only poorly) digested by fish. They therefore have no nutritional benefit and are considered to amount to wasted expenditure.

EP 0 711 510 relates to a process for the production of fermenting materials. In an intermediate stage, pellets of dried gluten products are made and the moisture content upon granulation is within the range of 12 to 18%. It is clearly demonstrated that the possibility of forming pellets is dependent upon moisture content and denaturation of the proteins.

U.S. Pat. No. 5,102,671 relates to a process for the manufacture of feed pellets. The wheat gluten is added only in the order of one or three percent.

EP 0 838 159 describes a method for the size reduction of wet gluten. The method applies wet gluten for size reduction. The granules are stored at temperatures below 0° C.

EP 1 527 700 describes fish feed and process for preparing the same. The composition comprises at maximum 75% gluten and beyond the proteins dehulled oilseeds are present.

U.S. Pat. No. 6,309,680 relates to a pelletization process wherein the wheat gluten is denatured.

There is therefore a clear need for an alternative and more economical method of producing pellets consisting of dried compressed proteins, and more in particular still comprising vital wheat gluten. The present invention provides such a method.

SUMMARY OF THE INVENTION

The current invention relates to a pellet consisting of compressed proteins and a moisture content of maximum 12%, wherein the proteins comprise vital wheat gluten, preferably is consisting of vital wheat gluten.

Furthermore the current invention relates to a process for preparing pellets of compressed proteins, comprising vital wheat gluten and said process comprises the following steps:
a) feeding protein comprising vital wheat gluten into a suitable equipment,
b) providing into the equipment heated air or steam to increase the temperature of the proteins and/or the moisture content with 0 to 5%, preferably up to 3%,
c) pouring the heated proteins through a die for obtaining pellets,
d) collecting the pellets.

The invention relates further to a process wherein the die has a ratio (A) of thickness to diameter from 10 to 25.

Furthermore the temperature of step b) is selected such that the ratio (B) of said temperature to (A) is from 2 to 8, more specifically the temperature is from 50 to 80° C.

Furthermore the invention relates to a process wherein at least 15 weight % of the proteins have a particle size of 200 µm or more.

Finally, the invention relates to fish feed comprising the pellets of the current invention and suitable fish feed ingredients.

DETAILED DESCRIPTION

The current invention relates to a pellet consisting of compressed proteins, and the moisture content of the pellet is maximum 12%. The compressed proteins comprise vital wheat gluten or consist essentially of vital wheat gluten. In another embodiment, the pellets have a moisture content of maximum 11.5%, preferably maximum of 10%, more preferably maximum 8%, most preferably maximum of 6%. The pellets consist of dried compresses proteins, more preferably dried vital gluten, most preferably dried vital wheat gluten. The dry substance of the pellets is exclusively made up of compressed proteins.

The so-formed pellets are texturised, stable upon transportation and stable upon storage. There is no moulding observed during long-term storage.

The proteins can be from vegetal or animal origin.

The vegetable protein is selected from the group consisting of leguminous-based proteins, proteins from proteaginous plants and cereal based proteins, their crossbreds and mixtures thereof. The proteins from leguminous plants are selected from the group consisting of proteins from bean, soybean, pea, lupin, and alfalfa. The proteaginous plants are sunflower, rapeseed, linseed and peanut. Only the proteins of these proteaginous plants are of interest for the current invention. The cereal-based proteins are obtained from corn, wheat, rice, rye, oat, and sorghum. Preferably the vegetable protein is derived from wheat or corn, and mixtures thereof, more preferably vital wheat gluten.

Gluten is the protein found in many grains and cereals such as wheat, corn, oats, rye and barley. The term "gluten" as used herein refers to gluten from any available source and to mixtures of gluten from different sources. Vital wheat gluten has the ability to be very elastic when water is added. This sets it apart from other vegetable proteins.

Pellets is encompassing grains, granules, and other types of particles, in so far it relates to compressed material.

Without going into detailed explanation, the current invention demonstrates that the dry substance of the vital wheat gluten and the moisture content of the final pellets is important in order to be able to make stable pellets of compressed proteins, and wherein the vitality of the wheat gluten is maintained.

Furthermore the current invention relates to a process for preparing pellets of compressed protein, containing vital wheat gluten and said process comprises the following steps:
a) feeding proteins to a suitable equipment,
b) providing into the equipment heated air or steam to increase the temperature of the protein and/or the moisture content with 0 to 5%, preferably up to 3%,
c) pouring the heated proteins through a die for obtaining pellets,
d) collecting the pellets.

Controlling the potential addition of moisture (from 0 to 5%, preferably up to 3%), is an essential feature to finally collect in step d) pellets comprising vital gluten.

The pellets of the present invention can be prepared by (a) feeding the protein into a pelletizing equipment and (b) shaping into pellets of compressed proteins.

The protein can be introduced into a pre-conditioning device (=suitable equipment) where the proteins are continuously mixed, heated and moistured by injection of dried air, hot water and/or steam.

Most pre-conditioners contain one or two mixing/conveying elements which consist of rotating shafts with radically attached pitched paddles. The equipment used for pre-conditioning includes atmospheric or pressurised chambers.

Moisture added in an amount of 0 to 5% by weight of the dry proteins, preferably up to 3%, entering the pre-conditioner.

The pre-conditioned mixture is then conveyed into a press equipped with die holes for obtaining pellets.

The proteins can be brought directly into a press when it is equipped with an additional inlet for dry air, hot water and/or steam.

It has surprisingly been found that the configuration of the die is such that the ratio (A) of thickness to diameter of die is from 10 to 25. This specific set-up allows the preparation of pellets consisting of dried compressed proteins with maximum moisture content of 12% and wherein the proteins are comprising vital gluten.

Actually with a ratio (A) of 10, the appropriate temperature is 80° C., whereas at a ratio (A) of 25, the suitable temperature is 50° C. The temperature of step b) is selected such that the ratio (B) of said temperature to (A) is from 2 to 8.

More specifically the temperature is from 50 to 80° C.

According to one preferred embodiment the die has a ratio (A) of 10 and the temperature is 80° C., resulting in a ratio (B) of 8. These conditions allow for obtaining pellets comprising vital wheat gluten. After collection of the pellets, the pellets are milled and it is confirmed that the wheat gluten is still vital.

According to another preferred embodiment the die has a ratio (A) of 25 and the temperature is 50° C., which is giving a ratio (B) of 2. After collection of the pellets it is confirmed that the wheat gluten is still vital.

A ratio (B) of temperature to ratio (A) between 2 and 8 avoids blocking pelletizing and the protein is not hydrolysed, with the vital wheat gluten is keeping its vitality.

It has surprisingly been found that the pellets containing vital wheat gluten can be prepared by (a) feeding the protein and (b) shaping into pellets, by applying a suitable ratio of temperature to ratio (A) of the die.

The choice of the pellet shape, volume and weight will of course depend on the desired application. For example, different fish types will require different pellets. The pellets of the present invention can be adapted for any type of farmed fish including yellowtail, sea bream, halibut, yellow jack, carp, trout, eel, cat fish, scrimp, and, most preferably, salmon.

The specific (nutritional and physical) requirements for each of these fish types will be known to the skilled person.

The process of preparing the pellets of the present invention may comprise a further step of treating the pellets with steam for 1 to 30 seconds. This simple procedure allows the surface of the pellet to be hardened. The thickness of the hardened layer will increase with the length of steam treatment and will affect the sinking behaviour of the resultant pellets. Thus, this steam treatment can be used to ensure that the pellets have the correct floatability. It will also improve the pellets resistance against physical stress, for instance during storage, transport and distribution. The post-treatment should be sufficient to harden the surface, which maintaining the vitality of the wheat gluten.

Furthermore the invention relates to a process wherein the proteins of step a) have an effective particle size in order to obtain in step d) suitable pellets, more specifically at least 15 weight % of the proteins (based on dry substance) have a particle size of 200 μm or more. The suitable particle size avoids among others that the equipment for preparing the pellets gets blocked by dusting protein material. In particular the vital wheat gluten of a particle size of 200 μm or more is giving superior results for obtaining pellets.

Finally, the invention relates to fish feed comprising the pellets of the current invention and in addition suitable fish feed ingredients. Such suitable fish feed ingredients may include without limiting ourselves, lipids, one or more carbohydrates, vitamins and minerals nutritionally required by fish, amino acids, pigments, antioxidants, colouring agents, enzymes, carotenoids, preservatives, pro- and/or prebiotics, trace elements and any other compounds commonly used in small quantities in feed compositions.

The current invention has at least the following advantages:
During transportation the pellets avoid dusting and the unloading of transport means is more efficient.
The pellets also cause a more efficient spread of the material when feeding the animals.
The incorporation of these pellets into fish feed is more efficient.

The invention will now be described in more detail by way of the following non-limiting examples.

EXAMPLES

Example 1

25 kg Vital wheat Gluten meal (C*Gluvital 21000-Cargill) was continuously sent from a vertical mixer into a pre-conditioner with rotating axis provided with blades in which steam was added resulting in a temperature of the wheat gluten of 50-55° C. and in water addition between 1% and 3%. The pre-conditioned wheat gluten was conveyed into a Robinson Milling (UMT) labor monoroll press equipped with a 4*50 mm mould dye holes of 4 mm diameter and 50 mm length. The pellets were sieved and cooled to the room temperature. The wheat gluten pellets were vital after being milled again.

Example 2

25 kg blends of Vital wheat Gluten meal (C*Gluvital 21000-Cargill) and Corn Gluten Meal (C* 13871-Cargill) in different ratios (see table 1) were continuously sent from a vertical mixer to the same pre-conditioner in which again steam was added to result in a meal temperature of 50 to 55° C. and in water addition of max. 3%.

The conditioned mixtures are sent through the same press, and sieved and cooled to room temperature.

The wheat gluten in the pellets were vital after being milled again.

TABLE 1

| Mixture | Vital wheat gluten meal % | Corn gluten meal % |
|---|---|---|
| 1 | 75 | 25 |
| 2 | 80 | 20 |
| 3 | 85 | 15 |
| 4 | 90 | 10 |
| 5 | 95 | 5 |

Example 3

Vital Wheat Gluten meal (C*Gluvital-Cargill) was at room temperature was continuously sent from a silo to the pre-conditioner, a turbulator mixer with steam injection. Steam was added to reach temperatures in a range of 50-55° C. and a moisture increase of the meal of 2%. The conditioned products are continuously sent in a Heessen V3-30 press with hydraulic roll adjustment. The press was equipped with a 3*65 mm mould. The pellets were cooled and sieved. The wheat gluten was still vital after milling of the pellets.

Example 4

Mixtures with variable ratio's (see table 2) of Vital Wheat Gluten (C*Gluvital-Cargill) and Corn Gluten Meal (C* 13871-Cargill) were sent to a preconditioning step (turbulator mixer with steam injection). Steam was added to reach meal temperatures in a range of 50-55° C. and to reach a moisture increase of 2%. The conditioned products are continuously supplied into a Heessen V3-30 press with hydraulic roll adjustment. The press was equipped with a 3*65 mm mould. The pellets were cooled and sieved.

The wheat gluten, after milling the pellets, was still vital.

TABLE 2

| Mixture | Vital wheat gluten % (kg/kg mixture) | Corn gluten meal % (kg/kg mixture) |
|---|---|---|
| 1 | 75 | 25 |
| 2 | 80 | 20 |
| 3 | 85 | 15 |
| 4 | 90 | 10 |
| 5 | 95 | 5 |

Example 5

Vital Wheat Gluten (C*Gluvital-Cargill) were sent from a silo to a pre-conditioner (provided with rotating axis with blades) at a rate of 6.5 ton per hour. Steam was added to reach temperatures in a range of 69 to 80° C. and moisture increase of 1 to 2%. The conditioned products were sent continuously to a CPM 3000 pellet press. The press was equipped with a 6*65 mm mould. The pellets were sieved and cooled. The wheat gluten was still vital after this pelletising step.

500 ton of wheat gluten pellets were produced.

Example 6

25 kg Corn Gluten meal (C* 13871) was continuously sent from a vertical mixer into a pre-conditioner with rotating axis provided with blades in which steam was added, resulting in a temperature of the corn gluten of 45° C. to 75° C. and in water addition of maximum 3%.

The pre-conditioned corn gluten was conveyed into a Robinson Milling (UMT) labor monoroll press equipped with a 4*50 mm mould (dye holes of 4 mm diameter and 50 mm length). The pellets were sieved and cooled to the room temperature. The corn gluten pellets were vital after being milled again.

The invention claimed is:

1. A pellet having a moisture content not greater than 10%, wherein the dry substance of the pellet consists essentially of compressed vital gluten proteins.

2. A pellet according to claim 1 characterised in that the pellet consists of compressed vital gluten proteins.

3. Fish feed or fish feed ingredients comprising the pellets according to claim 1.

4. A process for preparing a pellet having a moisture content not greater than 10%, wherein the dry substance of the pellet consists essentially of compressed vital gluten proteins, wherein said process comprises the following steps:
    a) feeding proteins consisting essentially of vital gluten into a pre-conditioning device,
    b) providing, into the equipment, heated air or steam to increase the temperature of the vital gluten proteins and/or the moisture content of the vital gluten proteins by 0 to 5%,
    c) pouring the heated vital gluten proteins through a die for obtaining pellets,
    d) collecting the pellets, wherein the pellets consist essentially of compressed vital gluten proteins and have a moisture content of not greater than 10%.

5. A process according to claim 4 characterised in that the die has a ratio (A) of thickness (of the die at the die hole) to diameter (of the die hole) of from 5 to 25.

6. A process according to claim 5 characterised in that the temperature of the heated air or steam of step b) is selected such that the ratio (B) of said temperature to ratio (A) of thickness (of the die at the die hole) is from 2 to 18.

7. A process according to claim 6 characterised in that the temperature of the heated air or steam is from 50 to 90° C.

8. A process according to claim 4 characterised in that at least 15 weight % of the proteins have a particle size of 200 μm or more.

9. A process according to claim 4, wherein the moisture content is increased by up to 3%.

10. A process according to claim 5, wherein the die has a ratio (A) of thickness (of the die at a die hole) to diameter (of the die hole) of from 10 to 25.

11. A process according to claim 6, wherein the temperature of the heated air or steam of step b) is selected such that the ratio (B) of said temperature to ratio (A) of thickness (of the die at the die hole) is from 2 to 8.

12. A process according to claim 7, wherein the temperature of the heated air or steam is from 50 to 80° C.

13. A pellet according to claim 1 having a moisture content not greater than 8%.

14. A process for preparing a pellet having a moisture content not greater than 10%, wherein the dry substance of the pellet consists essentially of compressed vital gluten proteins, wherein said process comprises the following steps:
    a) feeding the proteins into a pelletizing equipment, and
    b) shaping the proteins into pellets consisting essentially of compressed vital gluten proteins having a moisture content not greater than 10%.

* * * * *